(12) United States Patent
Sun et al.

(10) Patent No.: US 11,595,470 B1
(45) Date of Patent: Feb. 28, 2023

(54) RESOLVING L2 MAPPING CONFLICTS WITHOUT REPORTER SYNCHRONIZATION

(71) Applicant: VMware, Inc., Palo Alto, CA (US)

(72) Inventors: Li Sun, Sunnyvale, CA (US); Aravinda Kidambi Srinivasan, Mountain View, CA (US); Deepika Kalani, Milpitas, CA (US); Xiaozheng Guo, Sunnyvale, CA (US); Yang Ping, San Jose, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

(21) Appl. No.: 17/478,708

(22) Filed: Sep. 17, 2021

(51) Int. Cl.
  *H04L 67/1008* (2022.01)
  *H04L 67/1097* (2022.01)
  *H04L 43/106* (2022.01)
  *H04L 61/103* (2022.01)
  *H04L 101/622* (2022.01)

(52) U.S. Cl.
  CPC ........ *H04L 67/1008* (2013.01); *H04L 43/106* (2013.01); *H04L 61/103* (2013.01); *H04L 67/1097* (2013.01); *H04L 2101/622* (2022.05)

(58) Field of Classification Search
  CPC . H04L 67/1008; H04L 43/106; H04L 61/103; H04L 67/1097; H04L 2101/622
  See application file for complete search history.

(56) References Cited

U.S. PATENT DOCUMENTS

| | | | |
|---|---|---|---|
| 2005/0117525 A1* | 6/2005 | Poustchi | H04L 61/5092 370/254 |
| 2007/0115967 A1* | 5/2007 | Vandenberghe | H04L 41/12 370/256 |
| 2012/0317566 A1* | 12/2012 | Santos | H04L 45/742 718/1 |
| 2014/0064104 A1* | 3/2014 | Nataraja | H04L 61/103 370/254 |
| 2018/0139104 A1* | 5/2018 | Seddigh | H04L 41/12 |

* cited by examiner

*Primary Examiner* — Viet D Vu
(74) *Attorney, Agent, or Firm* — Kim & Stewart LLP

(57) ABSTRACT

A method of recording layer-2 (L2) mappings created for workloads executing on a plurality of hosts in a first database managed by a network management server: upon receipt of a first mapping reported by a first host, determining that the first mapping is not recorded in the first database; and in response to the determining that the received first mapping is not recorded in the first database, generating a first timestamp and persisting a first record in the first database that includes the first mapping and the first timestamp.

27 Claims, 11 Drawing Sheets

Time 0 - ARP Records

| DB Instance Table ||||||
|---|---|---|---|---|---|
| UUID | TCP | Logical Timestamp | VM IP Address | VM MAC Address | Delete |
| A | 1 | 0 | 100.100.100.1 | 01:23:45:67:89:A1 | NULL |
|   |   | 1 | 100.100.100.2 | 01:23:45:67:89:A2 | NULL |

Time 1 - Host A loses connection to control plane (power off)

| DB Instance Table ||||||
|---|---|---|---|---|---|
| UUID | TCP | Logical Timestamp | VM IP Address | VM MAC Address | Delete |
| A | 0 | 0 | 100.100.100.1 | 01:23:45:67:89:A1 | MM/DD HH:MM |
|   |   | 1 | 100.100.100.2 | 01:23:45:67:89:A2 | MM/DD HH:MM |

Time 2 - VMs are activated on host B (HA service), and host B reports new mappings

| DB Instance Table ||||||
|---|---|---|---|---|---|
| UUID | TCP | Logical Timestamp | VM IP Address | VM MAC Address | Delete |
| A | 0 | 0 | 100.100.100.1 | 01:23:45:67:89:A1 | MM/DD HH:MM |
|   |   | 1 | 100.100.100.2 | 01:23:45:67:89:A2 | MM/DD HH:MM |
| B | 1 | 2 | 100.100.100.1 | 01:23:45:67:89:A3 | NULL |
|   |   | 3 | 100.100.100.2 | 01:23:45:67:89:A4 | NULL |

Figure 2

Time 0 - VTEP Record

| DB Instance Table ||||||
|---|---|---|---|---|---|
| UUID | TCP | Logical Timestamp | VTEP IP Address | VTEP MAC Address | Delete |
| C | 1 | 10 | 200.200.200.1 | 01:23:45:67:89:B1 | NULL |

Time 1 - Host C loses connection to control plane (power off)

| DB Instance Table ||||||
|---|---|---|---|---|---|
| UUID | TCP | Logical Timestamp | VTEP IP Address | VTEP MAC Address | Delete |
| C | 0 | 10 | 200.200.200.1 | 01:23:45:67:89:B1 | MM/DD HH:MM |

Time 2 - Administrator activates host D, and host D reports new mapping

| DB Instance Table ||||||
|---|---|---|---|---|---|
| UUID | TCP | Logical Timestamp | VTEP IP Address | VTEP MAC Address | Delete |
| C | 0 | 10 | 200.200.200.1 | 01:23:45:67:89:B1 | MM/DD HH:MM |
| D | 1 | 11 | 200.200.200.1 | 01:23:45:67:89:B2 | NULL |

Figure 3

Time 0 - MAC Record

| DB Instance Table ||||||
|---|---|---|---|---|---|
| UUID | TCP | Logical Timestamp | VM MAC Address | VTEP Port | Delete |
| E | 1 | 20 | 01:23:45:67:89:C1 | W (VTEP 122-1) | NULL |

Time 1 - Host E loses connection to control plane (networking issues)

| DB Instance Table ||||||
|---|---|---|---|---|---|
| UUID | TCP | Logical Timestamp | VM MAC Address | VTEP Port | Delete |
| E | 0 | 20 | 01:23:45:67:89:C1 | W (VTEP 122-1) | MM/DD HH:MM |

Time 2 - After "hot" migration, destination host F reports new mapping

| DB Instance Table ||||||
|---|---|---|---|---|---|
| UUID | TCP | Logical Timestamp | VM MAC Address | VTEP Port | Delete |
| E | 0 | 20 | 01:23:45:67:89:C1 | W (VTEP 122-1) | MM/DD HH:MM |
| F | 1 | 21 | 01:23:45:67:89:C1 | X (VTEP 122-2) | NULL |

Time 3 - Host F loses connection with control plane (networking issues)

| DB Instance Table ||||||
|---|---|---|---|---|---|
| UUID | TCP | Logical Timestamp | VM MAC Address | VTEP Port | Delete |
| E | 0 | 20 | 01:23:45:67:89:C1 | W (VTEP 122-1) | MM/DD HH:MM |
| F | 0 | 21 | 01:23:45:67:89:C1 | X (VTEP 122-2) | MM/DD HH:MM |

Time 4 - Host E reconnects to control plane, and after "hot" migration, and VM migrates back to host E before host E reports the deletion of local record

| DB Instance Table ||||||
|---|---|---|---|---|---|
| UUID | TCP | Logical Timestamp | VM MAC Address | VTEP Port | Delete |
| E | 1 | 20 | 01:23:45:67:89:C1 | W (VTEP 122-1) | NULL |
| F | 0 | 21 | 01:23:45:67:89:C1 | X (VTEP 122-2) | MM/DD HH:MM |

Figure 4

Time 0 - MAC Record

| DB Instance Local Record Table ||||||
|---|---|---|---|---|---|
| UUID | TCP | Logical Timestamp | VM MAC Address | VTEP Port | Delete |
| G | 1 | 30 | 01:23:45:67:89:D1 | Y (VTEP 122-3) | NULL |

Time 1 - Host G loses connection to control plane (power off)

| DB Instance Local Record Table ||||||
|---|---|---|---|---|---|
| UUID | TCP | Logical Timestamp | VM MAC Address | VTEP Port | Delete |
| G | 0 | 30 | 01:23:45:67:89:D1 | Y (VTEP 122-3) | MM/DD HH:MM |

Time 2 - After "cold" migration, receive new record from remote data center H (disaster recovery)

| DB Instance Local Record Table ||||||
|---|---|---|---|---|---|
| UUID | TCP | Logical Timestamp | VM MAC Address | VTEP Port | Delete |
| G | 0 | 30 | 01:23:45:67:89:D1 | Y (VTEP 122-3) | MM/DD HH:MM |

| DB Instance Remote Record Table ||||
|---|---|---|---|
| Site ID | Logical Timestamp | VM MAC Address | VTEP Port |
| H | 31 | 01:23:45:67:89:D1 | Z (VTEP 162-1) |

Time 3 - Host G powers back on and connects to control plane, and VM migrates to host G before host G reports the deletion of local record and before updated forwarding table message is received from data center H

| DB Instance Local Record Table ||||||
|---|---|---|---|---|---|
| UUID | TCP | Logical Timestamp | VM MAC Address | VTEP Port | Delete |
| G | 1 | 30 | 01:23:45:67:89:D1 | Y (VTEP 122-3) | NULL |

| DB Instance Remote Record Table ||||
|---|---|---|---|
| Site ID | Logical Timestamp | VM MAC Address | VTEP Port |
| H | 31 | 01:23:45:67:89:D1 | Z (VTEP 162-1) |

Figure 5

RESOLVING L2 MAPPING CONFLICTS WITHOUT REPORTER SYNCHRONIZATION

BACKGROUND

In a virtualized computing environment in which virtual machines (VMs) are instantiated in a plurality of hosts, hosts use layer-2 (L2) forwarding tables to perform fast lookups of addresses and ports. For example, entries of such tables include mappings between media access control (MAC) addresses of VMs and ports of virtual tunnel endpoints (VTEPs) configured in the hosts. When a host instantiates a VM, the host creates new mappings, including a new mapping between the MAC address of the VM and the VTEP of the host. Other hosts are then each provided with the new mapping for future communications.

When a VM is migrated from a source host with a first VTEP to a destination host with a second VTEP, the destination host creates and shares a new mapping between the MAC address of the VM, which has not changed, and the port of the second VTEP. The source host is expected to communicate that an old mapping between the MAC address of the VM and the port of the first VTEP is stale and should be deleted. However, the source host may be unable to do so. For example, the source host may experience networking issues or have powered off entirely. In this situation, a state of uncertainty exists because there are two mappings that conflict with each other.

One method that has been used for resolving such conflicts includes storing timestamps along with mappings. In this method, whenever a host generates a new mapping, the host also generates a timestamp and communicates the new mapping along with the timestamp. When there is a conflict, the mapping corresponding to the latest timestamp may often be assumed to be correct. However, for such timestamps to be useful, the clocks of the hosts must be synchronized.

Synchronizing the clocks of all the hosts of a virtualized computing environment may be impractical. For example, the virtualized computing environment may include thousands of hosts distributed across multiple data centers. Equipping a large number of hosts with software or hardware for synchronizing to a global clock is very expensive. A less expensive solution to resolving L2 mapping conflicts is thus desirable.

SUMMARY

Accordingly, one or more embodiments provide a method of recording L2 mappings created for workloads executing on a plurality of hosts in a first database managed by a network management server. The method includes the steps of: upon receipt of a first mapping reported by a first host, determining that the first mapping is not recorded in the first database; and in response to the determining that the received first mapping is not recorded in the first database, generating a first timestamp and persisting a first record in the first database that includes the first mapping and the first timestamp.

Further embodiments include a non-transitory computer-readable storage medium comprising instructions that cause a computer system to carry out the above method, as well as a computer system configured to carry out the above method.

BRIEF DESCRIPTION OF THE DRAWINGS

FIG. 2 is a sequence diagram illustrating an example of resolving conflicts between records that map VM internet protocol (IP) addresses to VM MAC addresses.

FIG. 3 is a sequence diagram illustrating an example of resolving a conflict between records that map VTEP IP addresses to VTEP MAC addresses.

FIG. 4 is a sequence diagram illustrating an example of resolving conflicts between records that map VM MAC addresses to VTEP ports.

FIG. 5 is a sequence diagram illustrating an example of resolving conflicts between records with mappings reported by hosts in different data centers.

DETAILED DESCRIPTION

Figure 1A:
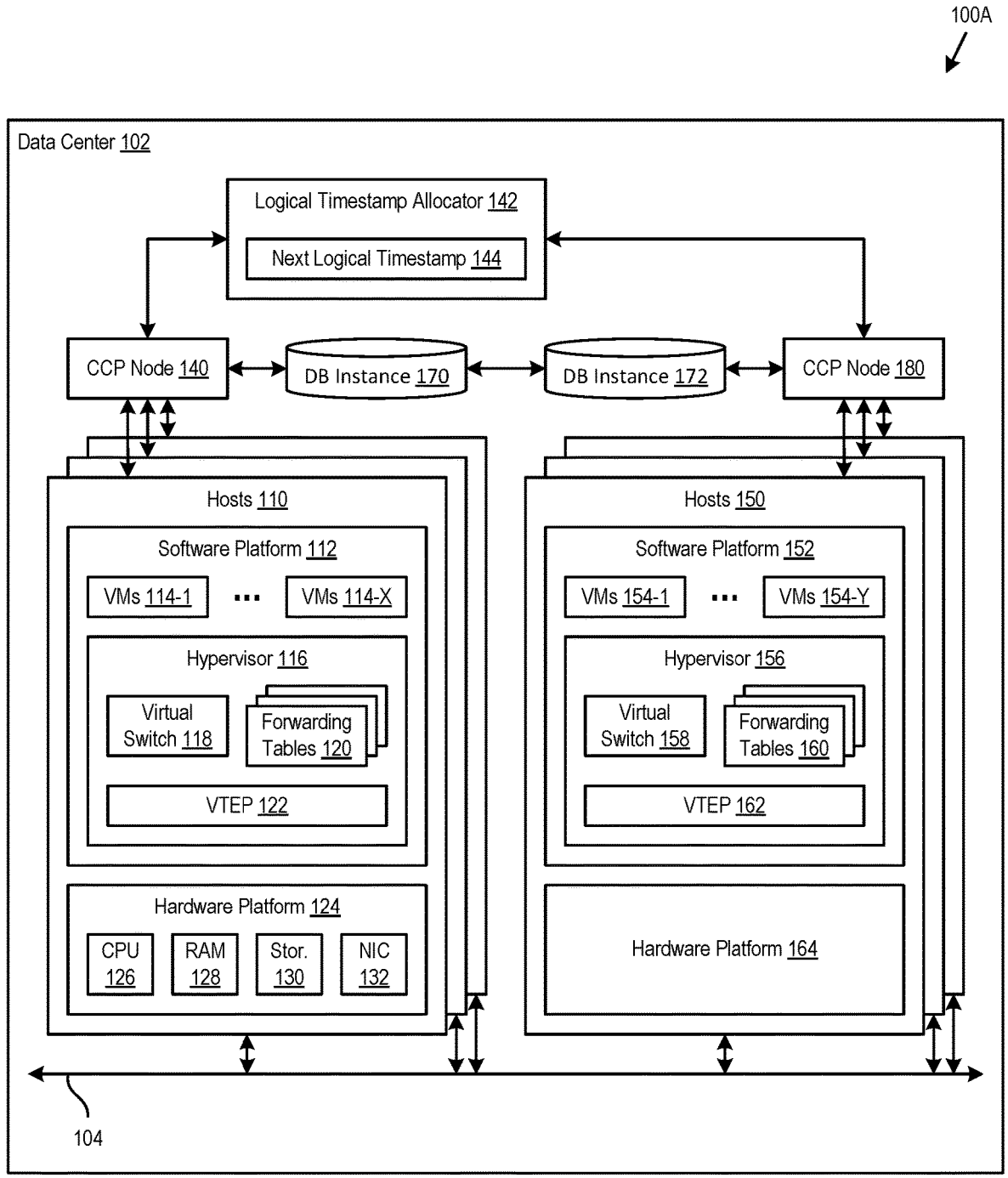
FIG. 1A is a block diagram of a virtualized computing system according to a first embodiment, which includes a single data center and in which mappings are recorded with logical timestamps.

Techniques for resolving L2 mapping conflicts in a software-defined networking (SDN) environment are described. A control plane of the SDN environment includes one or more nodes, referred to herein as "central control plane (CCP) nodes" or "network management servers." A data plane that is separate from the control plane includes hosts executing VMs. Each CCP node manages mapping information for a group of hosts. When a host creates a mapping, the host transmits the mapping to its corresponding CCP node. Upon receiving the mapping, the CCP node persists the mapping in a record of a database instance, and, from the database instance, generates an updated table of mappings. The CCP node then transmits the updated table to the hosts of the CCP node's group. The transmitted information is referred to herein as a "forwarding table message." The techniques apply to resolving conflicts between various types of L2 mappings, including: (1) mappings between internet protocol (IP) addresses of VMs and MAC addresses of VMs, (2) mappings between IP addresses of VTEPs and MAC addresses of VTEPS, and (3) mappings between MAC addresses of VMs and ports of VTEPs.

According to embodiments, timestamps are generated by CCP nodes in the control plane that receive mappings instead of being generated by hosts in the data plane that report the mappings. There is thus no need to synchronize the clocks of all the hosts. In some embodiments, when a CCP node receives a new mapping, the CCP node requests a logical timestamp from a logical timestamp allocator. Each logical timestamp is a unique value that indicates an order in which a corresponding mapping was detected compared to other mappings. In other embodiments, when a CCP node receives a new mapping, the CCP node creates a timestamp using its own physical clock, referred to herein as a "physical timestamp." In such embodiments, the CCP nodes synchronize their clocks to a network time protocol (NTP) server, which is less expensive than synchronizing the clocks of all the hosts, the hosts far outnumbering the CCP nodes.

In addition to timestamps, CCP nodes track connection statuses of hosts. Hosts that are connected to the control plane are referred to herein as having connection statuses that are "up," while hosts that are disconnected are referred to as having connection statuses that are "down." Referring to such connection statuses allows for detecting when the newest of conflicting mappings is stale. For example, the host that reported the newest mapping may have powered off and thus could not report the deletion of the mapping. In such a case, the newest mapping being stale may be determined from the connection status of the host being down.

According to some embodiments, the SDN environment includes a single data center in which CCP nodes persist records in synchronized database instances. In other embodiments, the SDN environment includes multiple data centers in which, for each data center, CCP nodes persist records in synchronized database instances. In multiple data center embodiments, CCP nodes transmit forwarding table messages between data centers to communicate updates to hosts of "stretched logical switches," i.e., logical switches that are stretched across data centers. These and further aspects of the invention are discussed below with respect to the drawings.

FIG. 1A is a block diagram of a virtualized computing system 100A according to a first embodiment, which includes a single data center 102 and in which mappings are recorded with logical timestamps. Data center 102 includes a first group of hosts 110 communicating with a CCP node 140 via a management network (not shown), a second group of hosts 150 communicating with a CCP node 180 via the management network, a logical timestamp allocator 142, and database instances 170 and 172. Although communicating with separate CCP nodes, hosts 110 and 150 communicate with each other via a logical switch (not shown). While FIG. 1A only includes two CCP nodes and a single logical switch for simplicity, virtualized computing system 100A may include one or more additional CCP nodes and several logical switches.

Each host 110 is constructed on a server grade hardware platform 124 such as an x86 architecture platform. Hardware platform 124 includes conventional components of a computing device, such as one or more central processing units (CPUs) 126, system memory 128 such as random-access memory (RAM), optional local storage 130 such as one or more hard disk drives (HDDs) or solid-state drives (SSDs), and one or more network interface cards (NICs) 132. CPU(s) 126 are configured to execute instructions such as executable instructions that perform one or more operations described herein, which may be stored in system memory 128. Local storage 130 of hosts 110 may also optionally be aggregated and provisioned as a virtual storage area network (vSAN). NIC(s) 132 enable hosts 110 to communicate with each other and with other devices over a physical network 104.

Each hardware platform 124 supports a software platform 112. Software platform 112 includes a hypervisor 116, which is a virtualization software layer that abstracts hardware resources of hardware platform 124 for concurrently running VMs 114. One example of a hypervisor 116 that may be used is a VMware ESX® hypervisor by VMware, Inc. Although the disclosure is described with reference to VMs, the teachings herein also apply to nonvirtualized applications and to other types of virtual computing instances such as containers, Docker® containers, data compute nodes, isolated user space instances, and the like for which L2 mapping conflicts arise.

Hypervisor 116 includes a virtual switch 118, forwarding tables 120, and a VTEP 122. Virtual switch 118 generates mappings used by VMs 114, transmits mappings to CCP node 140, and stores mappings in forwarding tables 120. VTEP 122 is used by VMs 114 to communicate over network 104, e.g., providing L2-over-L3 tunneling services for encapsulating egress packets from host 110 and decapsulating ingress packets to host 110.

CCP node 140 provides control plane functions for its group of hosts 110, including logical switching and routing. CCP node 140 may be a VM 114 executing in one of hosts 110 or a computer program that resides and executes in a central server. One example of CCP node 140 is the VMware NSX® Controller by VMware, Inc. When CCP node 140 receives a mapping from virtual switch 118, CCP node 140 checks database instance 170 to determine if the mapping is new or has already been persisted in a record of database instance 170. If the mapping is new, CCP node 140 transmits a request to logical timestamp allocator 142 for a logical timestamp.

Logical timestamp allocator 142, which may be a computer program executing in a central server, stores a next logical timestamp variable 144, the value of which is the next logical timestamp to return in response to a request. Next logical timestamp 144 is a unique value such as an integer that has not been returned in response to any previous requests. When CCP node 140 requests a logical timestamp, logical timestamp allocator 142 returns the value of next logical timestamp 144 and updates next logical timestamp 144, e.g., by incrementing its value to the next highest integer. When CCP node 140 receives a logical timestamp for a new mapping, CCP node 140 persists the new mapping and logical timestamp in a record of database instance 170.

Upon deletion of a mapping from a forwarding table 120, virtual switch 118 transmits information to CCP node 140 indicating the deletion. CCP node 140 then deletes the record comprising the mapping from database instance 170.

Like hosts 110, each host 150 is constructed on a server grade hardware platform 164 that includes conventional components of a computing device (not shown), such as one or more CPUs configured to execute instructions, system memory such as RAM, optional local storage such as one or more HDDs or SSDs, and one or more NICs for communicating with other hosts 150 and with other devices over network 104. Each hardware platform 164 supports a software platform 152 including a hypervisor 156 that abstracts hardware resources of hardware platform 164 for concurrently running VMs 154. Hypervisor 156 includes a virtual switch 158 for generating mappings used by VMs 154, transmitting mappings to CCP node 180, and storing mappings in forwarding tables 160. Hypervisor 156 also includes a VTEP 162 for communicating over network 104, e.g., providing L2-over-L3 tunneling services.

CCP node 180 provides control plane functions for its group of hosts 150, including logical switching and routing. CCP node 180 may be a VM 154 executing in one of hosts 150 or a computer program that resides and executes in a central server. Like CCP node 140, when CCP node 180 receives a new mapping from virtual switch 158, CCP node 180 transmits a request to logical timestamp allocator 142 for a logical timestamp. CCP node 180 then persists the new mapping in a record of database instance 172 along with a logical timestamp returned by logical timestamp allocator 142. When CCP node 180 receives information indicating a deletion of a mapping from a forwarding table 160, CCP node 180 deletes the corresponding record from database instance 172.

Database instances 170 and 172 communicate to form a distributed database for CCP nodes 140 and 180. When either database instance 170 or 172 is updated, it immediately transmits the update to the other database instance such that database instances 170 and 172 remain synchronized. Furthermore, upon an update to the distributed database, CCP nodes 140 and 180 generate an updated forwarding table, the updated forwarding table including the mappings of the records for the logical switch. CCP nodes 140 and 180 then transmit the generated forwarding table in a forwarding table message to hosts 110 and 150, respectively. Virtual switches 118 and 158 then read the forwarding table message and update forwarding tables 120 and 160 accordingly.

When there are conflicting records in the distributed database, CCP nodes 140 and 180 each determine which conflicting record is correct, i.e., up to date. In certain cases, the correct record may be selected based on the logical timestamps. For example, if logical timestamps are monotonically increasing integers, CCP nodes 140 and 180 may select the conflicting record corresponding to the largest logical timestamp, which is the most recently-added. However, in certain cases, the most recently-added record is incorrect. As such, in addition to logical timestamps, CCP nodes 140 and 180 also persist, in the distributed database, a connection status of each host 110 and 150. Specifically, CCP node 140 persists the connection statuses of hosts 110, and CCP node 180 persists the connection statuses of hosts 150. Whenever the connection status of a host 110 or 150 changes, the corresponding CCP node persists the change in its respective database instance. Examples in which the most recently-added records are incorrect are discussed below in conjunction with FIGS. 4 and 5.

Upon persisting a change in connection status from up to down, CCP node 140 or 180 persists the time at which the change was detected. CCP nodes 140 and 180 then delete the records corresponding to the down host after a predetermined amount of time has elapsed, e.g., twenty-four hours after the stored time. If a host 110's or 150's connection changes from down to up before its corresponding records are deleted, CCP nodes 140 and 180 delete the times for those records from the distributed database. In such cases, by not immediately deleting records of down hosts 110 and 150, CCP nodes 140 and 180 save the computing expense of requesting additional logical timestamps and persisting the same mappings multiple times.

Figure 1B:
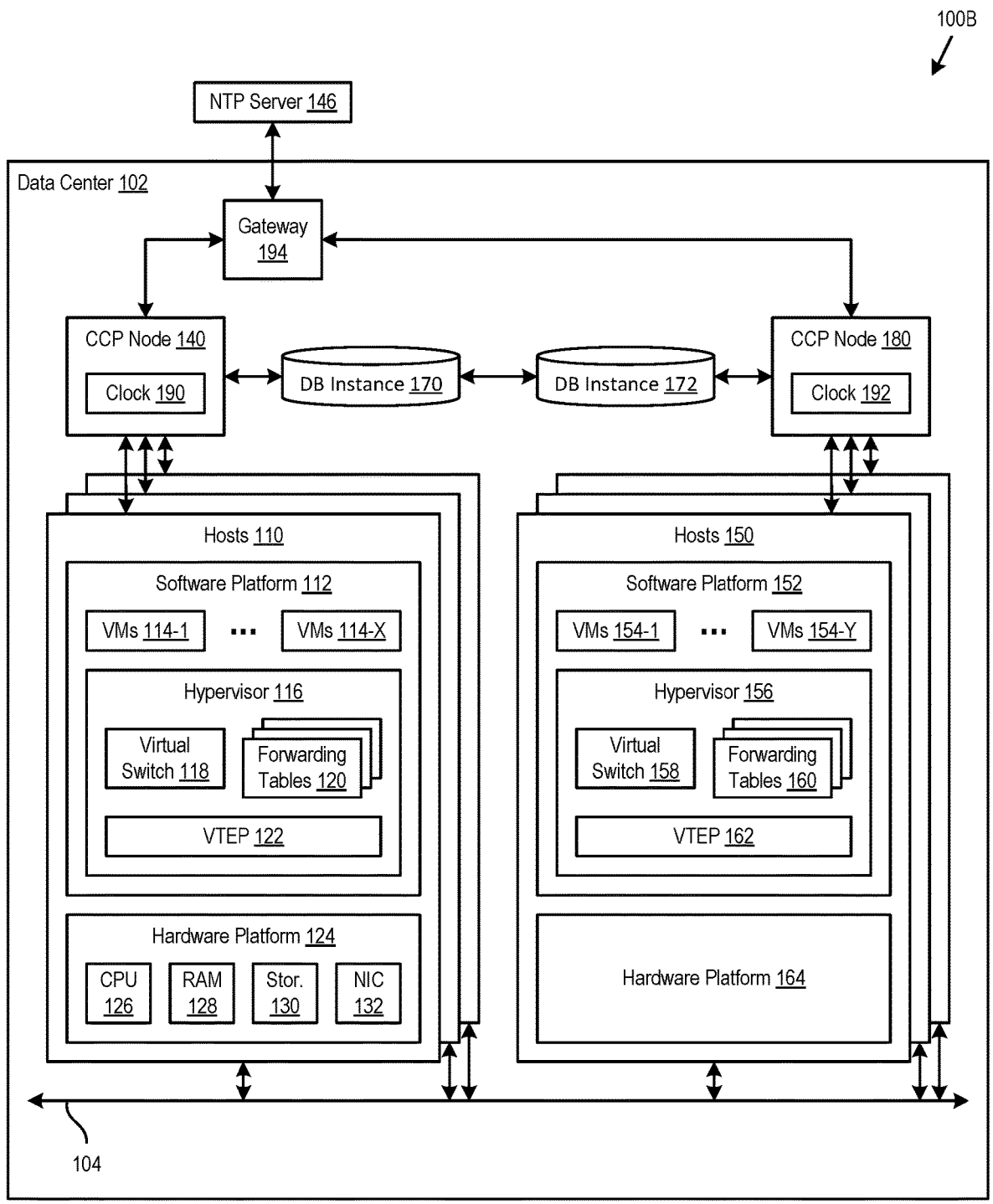
FIG. 1B is a block diagram of a virtualized computing system according to a second embodiment, which includes a single data center and in which mappings are recorded with physical timestamps.

FIG. 1B is a block diagram of a virtualized computing system 100B according to a second embodiment. Like virtualized computing system 100A, records are persisted in a distributed database of a single data center 102. However, such records are persisted with physical timestamps instead of logical timestamps. Items of FIG. 1B that are in common with FIG. 1A contain the same numbers and perform the same functionalities unless otherwise specified.

In the second embodiment, CCP nodes 140 and 180 generate physical timestamps using internal clocks 190 and 192, respectively. Each physical timestamp includes timing information such as a month, day, and time of day. If CCP nodes 140 and 180 reside in a host 110 and a host 150, clocks 190 and 192 are integrated circuits within the respective hosts 110 and 150 that each provide a date and time. Similarly, if CCP nodes 140 and 180 reside in central servers, clocks 190 and 192 are integrated circuits within the servers.

To synchronize clocks 190 and 192, CCP nodes 140 and 180 communicate with an NTP server 146 via a gateway 194. Gateway 194, which may be a computer program executing in a central server, provides devices in data center 102 with connectivity to an external network (not shown), e.g., the Internet. Gateway 194 routes traffic incoming to and outgoing from data center 102 and provides networking services such as firewalls, network address translation (NAT), dynamic host configuration protocol (DHCP), load balancing, and virtual private network (VPN) connectivity over the external network.

NTP server 146 maintains a coordinated universal time (UTC), which it communicates to each of CCP nodes 140 and 180. CCP nodes 140 and 180 then synchronize their respective clocks, e.g., to within milliseconds of UTC. When a CCP node 140 or 180 detects a new mapping reported by a host 110 or 150, the CCP node uses its respective clock to determine the time at which the new mapping was detected. CCP node 140 or 180 then persists the new mapping in a record of the distributed database along with a physical timestamp indicating the detection time. As with logical timestamps, because clocks 190 and 192 are synchronized with UTC, the order in which new mappings are detected may be determined by comparing the physical timestamps.

Figure 1C:
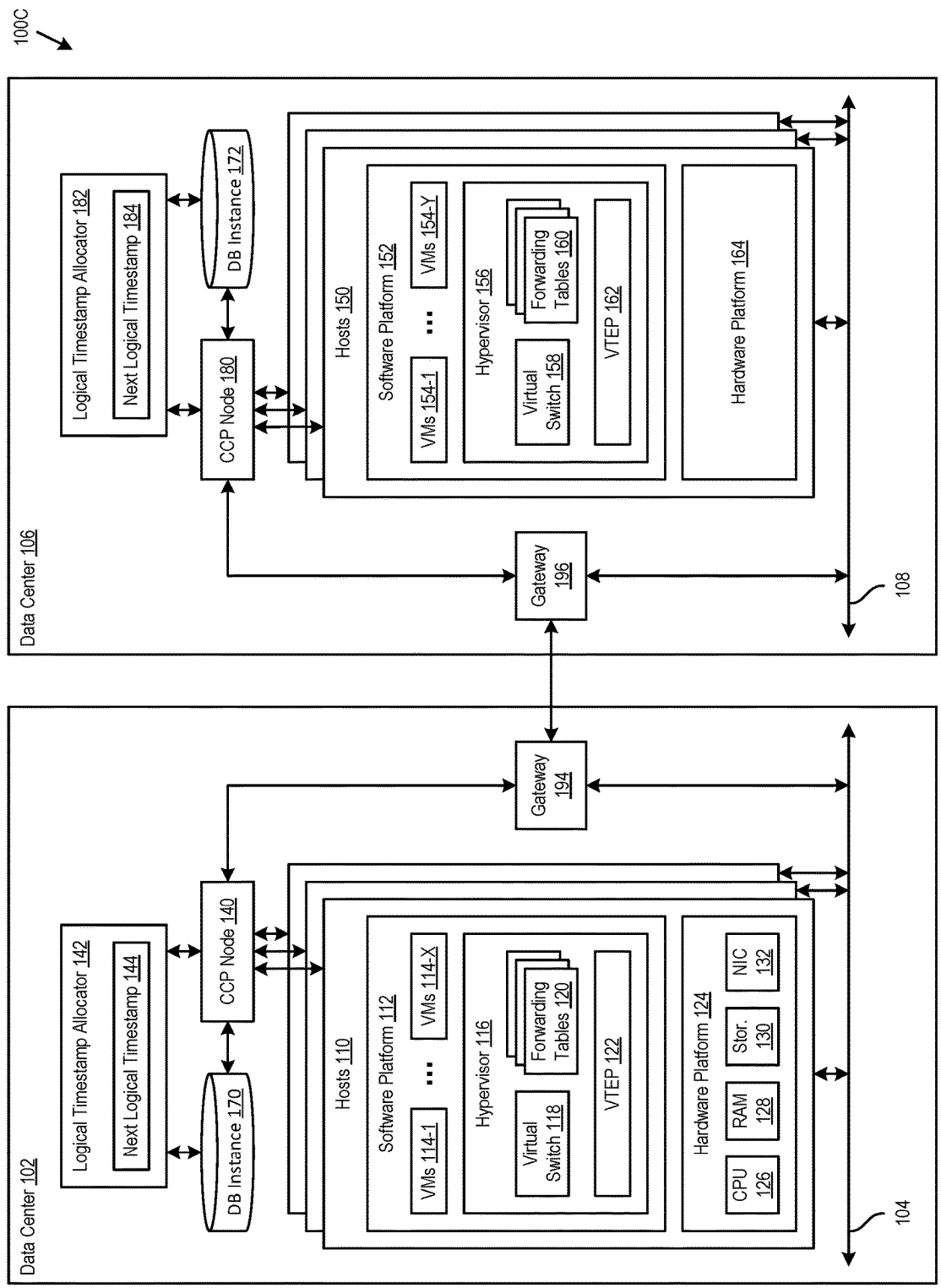
FIG. 1C, is a block diagram of a virtualized computing system according to a third embodiment, which includes multiple data centers and in which mappings are recorded with logical timestamps.

FIG. 1C is a block diagram of a virtualized computing system 100C according to a third embodiment, which includes multiple data centers 102 and 106 and in which mappings are recorded with logical timestamps. Items of FIG. 1C that are in common with FIGS. 1A and 1B contain the same numbers and perform the same functionalities unless otherwise specified.

In virtualized computing system 100C, hosts 110 and 150 are in separate data centers 102 and 106 along with database instances 170 and 172. However, hosts 110 and 150 still communicate with each other via a stretched logical switch that spans data centers 102 and 106. While FIG. 1C only includes a single CCP node and database instance in each of two data centers for simplicity, virtualized computing system 100C may include one or more additional data centers along with one or more additional CCP nodes and database instances per data center.

Hosts 110 communicate with each other and with other devices in data center 102 via physical network 104, while hosts 150 communicate with each other and with other devices in data center 106 via a physical network 108. Communication between data centers 102 and 106 is performed via gateways 194 and 196. Gateway 194 may be a VM 114 executing in one of hosts 110 or a computer program executing in a central server of data center 102. Gateway 196 may be a VM 154 executing in one of hosts 150 or a computer program executing in a central server of data center 106.

When CCP node 140 receives a new mapping from a virtual switch 118, CCP node 140 requests a logical timestamp from logical timestamp allocator 142, Once logical timestamp allocator 142 returns next logical timestamp 144, CCP node 140 persists the new mapping and the returned timestamp in a record of database instance 170. Similarly, when CCP node 180 receives a new mapping from a virtual switch 158, CCP node 180 requests a logical timestamp from a logical timestamp allocator 182. Once logical timestamp allocator 182 returns the value of a next logical timestamp variable 184, CCP node 180 persists the new mapping in a record of database 172 along with the returned timestamp. In the embodiments, logical timestamps 144 and 184 are generated independently and are not synchronized with each other.

To keep the mappings of databases 170 and 172 synchronized, when CCP node 140 updates database instance 170 in response to a new mapping reported by host 110, CCP node 140 generates an updated forwarding table and transmits the updated forwarding table to CCP node 180 (in addition to hosts 110). Likewise, upon an update to database instance 172 in response to a new mapping reported by host 150, CCP node 180 transmits an updated forwarding table to CCP node 140 (in addition to hosts 150). When a CCP node 140 or 180 receives a forwarding table message, to determine updates such as new mappings to persist and records to delete, mappings from the message are compared to the respective database instance. For each new mapping, the receiving CCP node 140 or 180 requests a logical timestamp from logical timestamp allocator 142 or 182 to persist in the respective database instance with the new mapping.

Figure 1D:
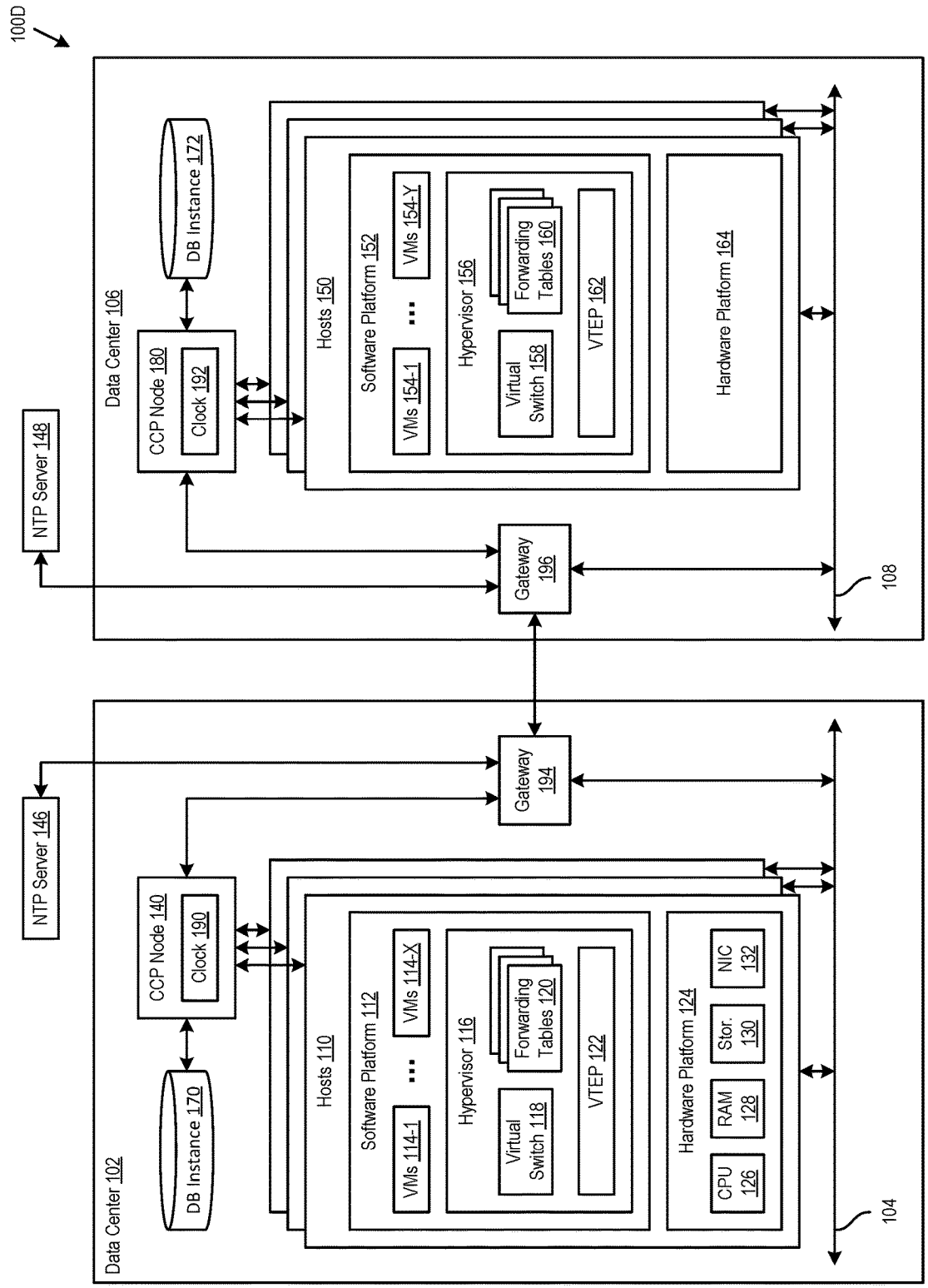
FIG. 1D is a block diagram of a virtualized computing system according to a fourth embodiment, which includes multiple data centers and in which mappings are recorded with physical timestamps.

FIG. 1D is a block diagram of a virtualized computing system 100D according to a fourth embodiment. Like virtualized computing system 100C, records are persisted in database instances 170 and 172 of separate data centers 102 and 106. However, such records are persisted with physical timestamps instead of logical timestamps. Items of FIG. 1D that are in common with FIG. 1C contain the same numbers and perform the same functionalities unless otherwise specified.

In the fourth embodiment, CCP nodes 140 and 180 generate physical timestamps using internal clocks 190 and 192, respectively. However, because they are in separate data centers 102 and 106 that may be far apart, e.g., in separate countries, CCP nodes 140 and 180 synchronize with separate NTP servers 146 and 148. For example, clock 190 may be kept within milliseconds of a UTC maintained by NTP server 146, and clock 192 may be kept within milliseconds of a UTC maintained by NTP server 148.

When CCP node 140 detects a new mapping reported by host 110 or in a forwarding table message from data center 106, CCP node 140 uses clock 190 to create a physical timestamp and persists the new mapping and the timestamp in a record of database instance 170. CCP node 140 then transmits forwarding table messages generated from database instance 170 accordingly. Likewise, when CCP node 180 detects a new mapping reported by host 150 or in a forwarding table message from data center 102, CCP node 180 uses clock 192 to create a physical timestamp and persists the new mapping and the timestamp in a record of database 172. CCP node 180 then transmits forwarding table messages generated from database instance 172 accordingly.

It should be noted that other CCP nodes of data center 102 (not shown) synchronize with the same NTP server 146, and other CCP nodes of data center 106 (not shown) synchronize with the same NTP server 148. However, in addition to not requiring synchronization of the clocks of each host 110 and 150, the techniques described herein do not require such synchronization of clocks across data centers 102 and 106. The techniques are thus less expensive than solutions in which reporters generate timestamps, whether such reporters are hosts within a data center or other data centers entirely.

FIG. 2 is a sequence diagram illustrating an example of resolving conflicts between records that map VM IP addresses to VM MAC addresses. Such records are referred to herein as "address resolution protocol (ARP) records," which comprise "ARP mappings." In the example of FIG. 2, CCP node 140 resolves a conflict in database instance 170 for a "high-availability (HA) cluster" of hosts, including a host A and a host B, that provide continuous uptime in the event of one of the hosts losing power. In the example, host A loses power and connection to CCP node 140, and VMs that are hosted in host A are recovered in host B with the same IP addresses.

The sequence diagrams of FIGS. 2-5 correspond to the embodiments of FIGS. 1A and 1C and utilize logical timestamps that are monotonically increasing integers. However, the sequence diagrams may be modified to correspond to the embodiments of FIGS. 1B and 1D by substituting the logical timestamps with physical timestamps.

At time 0, database instance 170 includes ARP records for a single host with a universally unique identifier (UUID) of "A," which can be a 128-bit number for example. The transmission control protocol (TCP) connection status of host A is "1" (up), indicating that host A is connected to CCP node 140. Database instance 170 includes two records for host A. The first record maps IP address "100.100.100.1" to MAC address "01:23:45:67:89:A1." The corresponding timestamp of the first record is 0, and because host A is connected to the control plane, the "delete" column in which a time would otherwise be stored contains the value "NULL." The second record maps IP address "100.100.100.2" to MAC address "01:23:45:67:89:A2." The corresponding timestamp is 1, indicating that the second record was detected after the first record.

At time 1, host A loses power, and CCP node 140 detects that host A is no longer connected via TCP. In response, CCP node 140 updates the connection status of host A from "1" (up) to "0" (down). Due to no longer being connected to the control plane, host A cannot report the deletion of any mappings. However, CCP node 140 stores, in the delete column for each of host A's records, the time at which the change in connection status was detected such that the records may be deleted after a predetermined time.

At time 2, two VMs 114 are activated on a host "B" in response to host A losing power. Host B thus reports two new ARP mappings to CCP node 140 for the two activated VMs 114. The administrator assigned the same IP addresses of "100.100.100.1" and "100.100.100.2" to the VMs 114 but assigned new MAC addresses of "01:23:45:67:89:A3" and "01:23:45:67:89:A4." Persisting the mappings in new records of database instance 170 with timestamps of 2 and 3 creates two conflicts: (1) the IP address "100.100.100.1" mapping to two different MAC addresses and (2) the IP address "100.100.100.2" mapping to two different MAC addresses.

To resolve the two conflicts, CCP node 140 refers to the connection statuses of hosts A and B. Host A's connection status is down, while host B's connection status is up. As such, for both conflicts, CCP node 140 determines that the record corresponding to host B is correct. CCP node 140 thus generates a forwarding table including the mappings corresponding to host B, but not those corresponding to host A. CCP node 140 then transmits the generated forwarding table to hosts 110 (and to other databases in multiple data center embodiments).

FIG. 3 is a sequence diagram illustrating an example of resolving a conflict between records that map VTEP IP addresses to VTEP MAC addresses. Such records are referred to herein as "VTEP records," which comprise "VTEP mappings." In the example of FIG. 3, CCP node 140 resolves a conflict in database instance 170 that is created when a host C powers off and loses connection to CCP node 140, and another host D is activated to replace host C, but the administrator uses the same IP address for VTEPs 122 on both hosts C and D.

At time 0, database instance 170 includes a VTEP record for a host "C" that is connected to CCP node 140. The record maps IP address "200.200.200.1" to MAC address "01:23:45:67:89:B1." The corresponding timestamp of the record is 10.

At time 1, host C loses power, and CCP node 140 detects that host C is no longer connected to the control plane. As such, CCP node 140 updates the connection status of host C from "1" to "0." CCP node 140 also stores, in the delete column for host C's record, the time at which the change in connection status was detected.

At time 2, the administrator activates a host "D" with a VTEP 122 for which the administrator reuses the IP address of "200.200.200.1" but uses a new MAC address of "01:23:45:67:89:B2." Host D thus reports a new VTEP mapping, which CCP node 140 persists in a VTEP record with a timestamp of 11. Persisting the new record in database instance 170 creates a conflict in which IP address "200.200.200.1" maps to two different MAC addresses.

To resolve the conflict, CCP node 140 refers to the connection statuses of hosts C and D. Host C's connection status is down, while host D's connection status is up. As such, CCP node 140 determines that the record corresponding to host D is correct, generates a forwarding table including the mapping corresponding to host D, and transmits forwarding table messages accordingly.

FIG. 4 is a sequence diagram illustrating an example of resolving conflicts between records that map VM MAC addresses to VTEP ports. Such records are referred to herein as "MAC records," which comprise "MAC mappings." In the example of FIG. 4, CCP node 140 resolves a first conflict in database instance 170 that is created when a host E loses connection to CCP node 140, and a VM 114 executing on host E migrates to another host F. CCP node 140 then resolves a second conflict when host F loses connection to CCP node 140, and a third conflict when the VM 114 migrates from host F back to host E.

At time 0, database instance 170 includes a MAC record for a host "E" that is connected to CCP node 140. The record maps MAC address "01:23:45:67:89:C1" to a port "W," W being a port number corresponding to a VTEP 122-1. The corresponding timestamp of the record is 20.

At time 1, host E experiences networking issues with the management network and thus loses connection to CCP node 140. In response, CCP node 140 updates host E's connection status in database instance 170 from "1" to "0" and persists the time at which the change in connection status was detected.

At time 2, the VM 114 corresponding to the record is migrated from host E to a host "F." The migration is carried out while the VM 114 is executing, which is referred to as a "hot" migration. In response, host F reports a new mapping between the IP address of the VM 114 to a port "X," X being a port number corresponding to a VTEP 122-2 of host F. Furthermore, although host E locally deletes the mapping corresponding to the record of timestamp 20, host E cannot report the deletion because it is disconnected from the control plane. There is thus a conflict in database instance 170 in which the MAC address "01:23:45:67:89:C1" is mapped to two different ports. To resolve the conflict, CCP node 140 checks the connection statuses, and because host E's connection status is down, CCP node 140 generates a forwarding table including the mapping corresponding to host F, and transmits forwarding table messages accordingly.

At time 3, host F experiences networking issues with the management network and loses connection to the control plane. In response, CCP node 140 updates the connection status for host F in database instance 170 from "1" to "0" and persists the time at which the change in connection status was detected. At this point, if CCP node 140 needs to resolve the conflict between the two MAC records, CCP node 140 cannot rely on the connection statuses of hosts E and F because they are both down. CCP node 140 may only make a best guess of which record is correct by checking the timestamps corresponding to the two records. Because the record corresponding to host F has a later timestamp (21), CCP node 140 guesses that the second timestamp is still correct and does not generate an updated forwarding table (after having done so at time 2).

At time 4, host E reconnects to the control plane, and the VM 114 immediately migrates back to host E (before host E reports the local deletion of the mapping corresponding to the record of timestamp 20). In response to host E reconnecting, CCP node 140 updates the connection status of host E in database instance 170 and removes the time of the record of host E. Furthermore, in response to VM 114 migrating back to host E, virtual switch 118 recreates the mapping corresponding to timestamp 20. Virtual switch 118 stores the mapping in forwarding table 120 and reports the mapping to CCP node 140. However, because a record already exists in database instance 170 comprising the mapping, CCP node 140 does not create a new record. Furthermore, due to no longer being connected to the control plane, host F cannot report the deletion of any mappings. There is thus still a conflict between the two records, which map the same MAC address (01:23:45:67:89:C1) to two different ports.

To resolve the conflict, CCP node 140 refers to the connection statuses of hosts E and F. Host F's connection status is down, while host E's connection status is up. As such, CCP node 140 determines that the record corresponding to host E is correct, generates a forwarding table including the mapping corresponding to host E, and transmits forwarding table messages accordingly. As illustrated by FIG. 4, the techniques described herein allow for correctly resolving conflicts when the earlier of two conflicting records is correct.

FIG. 5 is a sequence diagram illustrating an example of resolving conflicts between MAC records with mappings reported by hosts in different data centers. In the example of FIG. 4, CCP node 140 resolves a first conflict between MAC records in database instance 170 that is created when a host G powers off and loses connection to CCP node 140, and a disaster recovery service is used to recover a VM 114 from host G in a remote data center H. CCP node 140 then resolves a second conflict when host G powers back on, and the VM migrates back to host G.

In multiple data center embodiments, each database instance includes two separate tables: a first table with records of mappings reported by hosts within the same data center as the database instance, referred to herein as "local records," and a second table with records of mappings received from another data center, referred to herein as "remote records." The table of remote records is constructed from forwarding table messages received from remote data centers, which creates some differences with the table of local records. Firstly, because a CCP instance does not know the UUID of hosts in remote data centers, the CCP instance persists remote records with a "site ID," which is similar to a UUID of a host but instead corresponds to an entire data center. Secondly, because a CCP instance does not know the connection statuses of hosts in remote data centers, the CCP instance does not include such statuses for remote records. When there are conflicts between local and remote records, if the connection status of the local record is up, a CCP node prioritizes the local record. Otherwise, if all the connections statuses are down (or unknown in the case of remote records), the CCP node makes a best guess based on timestamps.

At time 0, database instance 170 includes, in a table of local records, a MAC record for a host "G" that is connected to CCP node 140. The record maps MAC address "01:23:45:67:89:D1" to a port "Y," Y being a port number corresponding to a VTEP 122-3. The corresponding timestamp of the record is 30.

At time 1, host G loses power, and CCP node 140 detects that host G is no longer connected to the control plane. As such, CCP node 140 updates the connection status of host G from "1" to "0." CCP node 140 also stores, in the delete column for host G's record, the time at which the change in connection status was detected.

At time 2, a disaster recovery service is used to "spin up" (power on) a VM 154 in a remote data center "H" in place of a VM 114. The recovery does not include the state of the memory of the VM 114, which was lost when host G powered off, the recovery also being referred to as a "cold migration." CCP node 140 receives a forwarding table message from CCP node 180 in data center H, the forwarding table message including a mapping between the MAC address of the migrated VM and a port "Z" of a host 150 in data center H. At the time CCP node 140 receives the forwarding table message from CCP node 180 in data center H, CCP node 140 acquires a logical timestamp 31 from logical timestamp allocator 142 and persists the mapping and timestamp in the table of remote records.

At this point, there are conflicting records mapping the MAC address "01:23:45:67:89:D1" to two different ports. To settle the conflict, CCP node 140 checks the connection status of the local record, which is down. CCP node 140 thus makes a best guess of which record is correct by checking the timestamps corresponding to the two records. Because the record corresponding to data center H has a later timestamp (31), CCP node 140 generates an updated forwarding table including the mapping from the remote record and transmits forwarding table messages accordingly.

At time 3, host G powers back on and deletes the mapping corresponding to the record with timestamp 30 from local forwarding table 120. Host G also reconnects with the control plane, and CCP node 140 updates the connection status of host G in database instance 170 and removes the time of the record of host G. Before host G reports the local deletion of the mapping, VM 154 is migrated back to host G (hot migration). In response to the migration, virtual switch 118 recreates the mapping corresponding to the record with timestamp 30. Virtual switch 118 stores the mapping in forwarding table 120 and reports the mapping to CCP node 140. However, because a record already exists in database instance 170 comprising the mapping, CCP node 140 does not create a new record.

At this point, there is still a conflict between the local and remote records. To settle the conflict, CCP node 140 checks the connection status of the local record, which is now up. CCP node 140 thus generates an updated forwarding table including the mapping from the local record and transmits forwarding table messages accordingly. Eventually, CCP node 140 should also receive a forwarding table message from data center H that does not include the mapping from MAC address 01:23:45:67:89:D1 to port Z, at which point there is longer a conflict.

Figure 6:
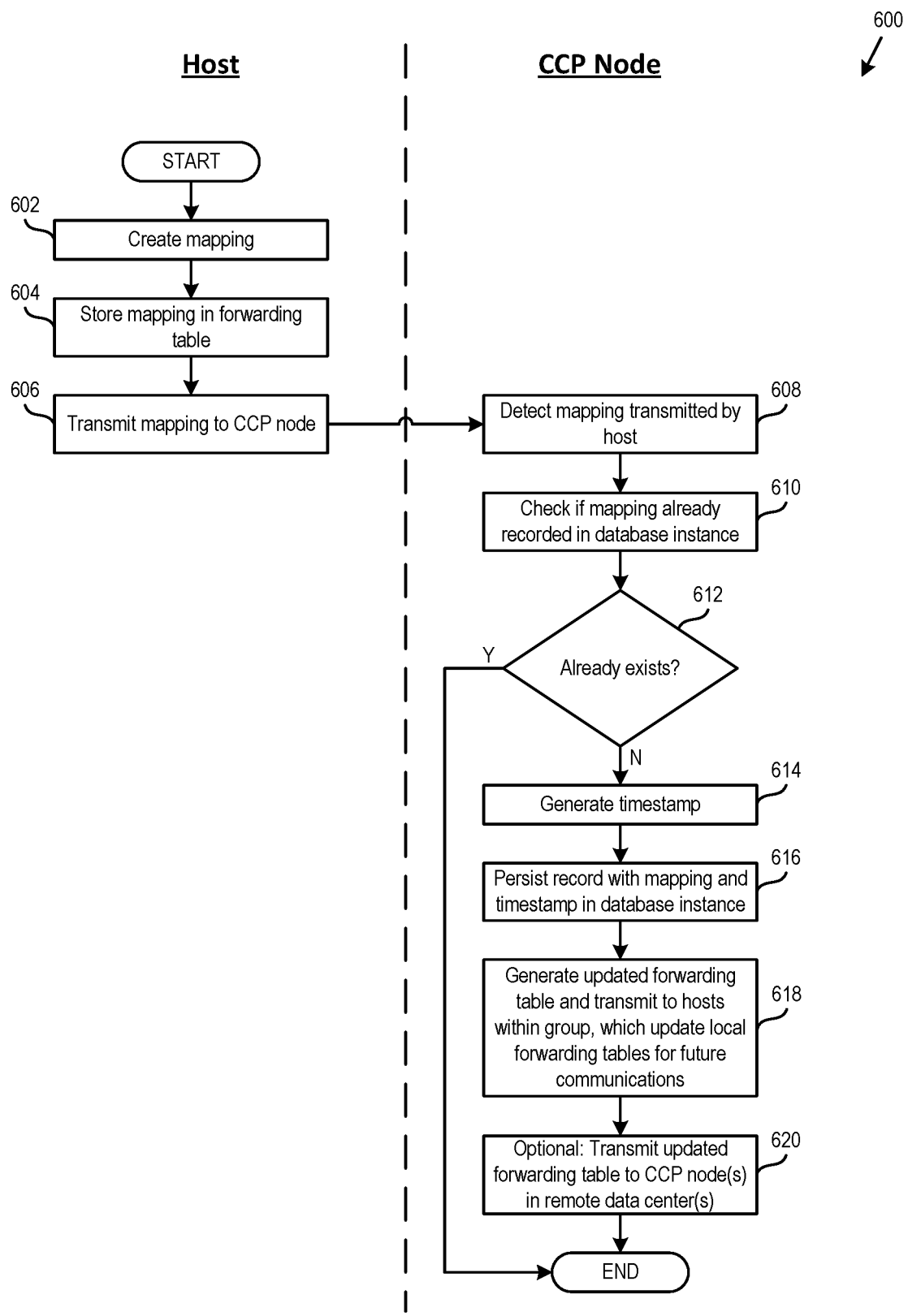
FIG. 6 is a flow diagram of steps carried out by a host and a central control plane node to carry out a method of persisting a record in a database instance and sharing an updated forwarding table, according to embodiments.

FIG. 6 is a flow diagram of steps carried out by a host 110 and CCP node 140 to carry out a method 600 of persisting a record in a database instance 170 and transmitting forwarding table messages, according to embodiments. At step 602, virtual switch 118 of host 110 creates a mapping, e.g., an ARP, VTEP, or MAC mapping. For example, virtual switch 118 may create an ARP mapping in response to a VM 114 being spun up on host 110. At step 604, virtual switch 118 stores the created mapping in a forwarding table 120. At step 606, virtual switch 118 transmits the mapping to CCP node 140.

At step 608, CCP node 140 detects the mapping transmitted by host 110. At step 610, CCP node 140 checks database instance 170 to determine if a record comprising the mapping already exists. For example, the mapping may have been reported by a host 110 whose connection status recently changed from down to up. At step 612, if the mapping already exists in database instance 170, method 600 ends.

If the mapping does not exist in database instance 170, method 600 moves to step 614, and CCP node 140 generates a timestamp for the record. For example, in embodiments with logical timestamps, CCP node 140 requests a timestamp from logical timestamp allocator 142, and logical timestamp allocator 142 transmits next logical timestamp 144 to CCP node 140. In embodiments with physical timestamps, CCP node 140 creates the physical timestamp from its clock 190. At step 616, CCP node 140 persists a record with the mapping and timestamp in database instance 170.

At step 618, CCP node 140 generates an updated forwarding table including the mapping of the record persisted at step 616. CCP node 140 then transmits the updated forwarding table in a forwarding table message to hosts 110 within CCP nodes 140's group, the hosts 110 updating their local forwarding tables 120 for future communications. At step 620, which applies to multiple data center embodiments with a stretched logical switch, CCP node 140 transmits the forwarding table message to a CCP node(s) in a remote data center(s). After step 620, method 600 ends.

Figure 7:
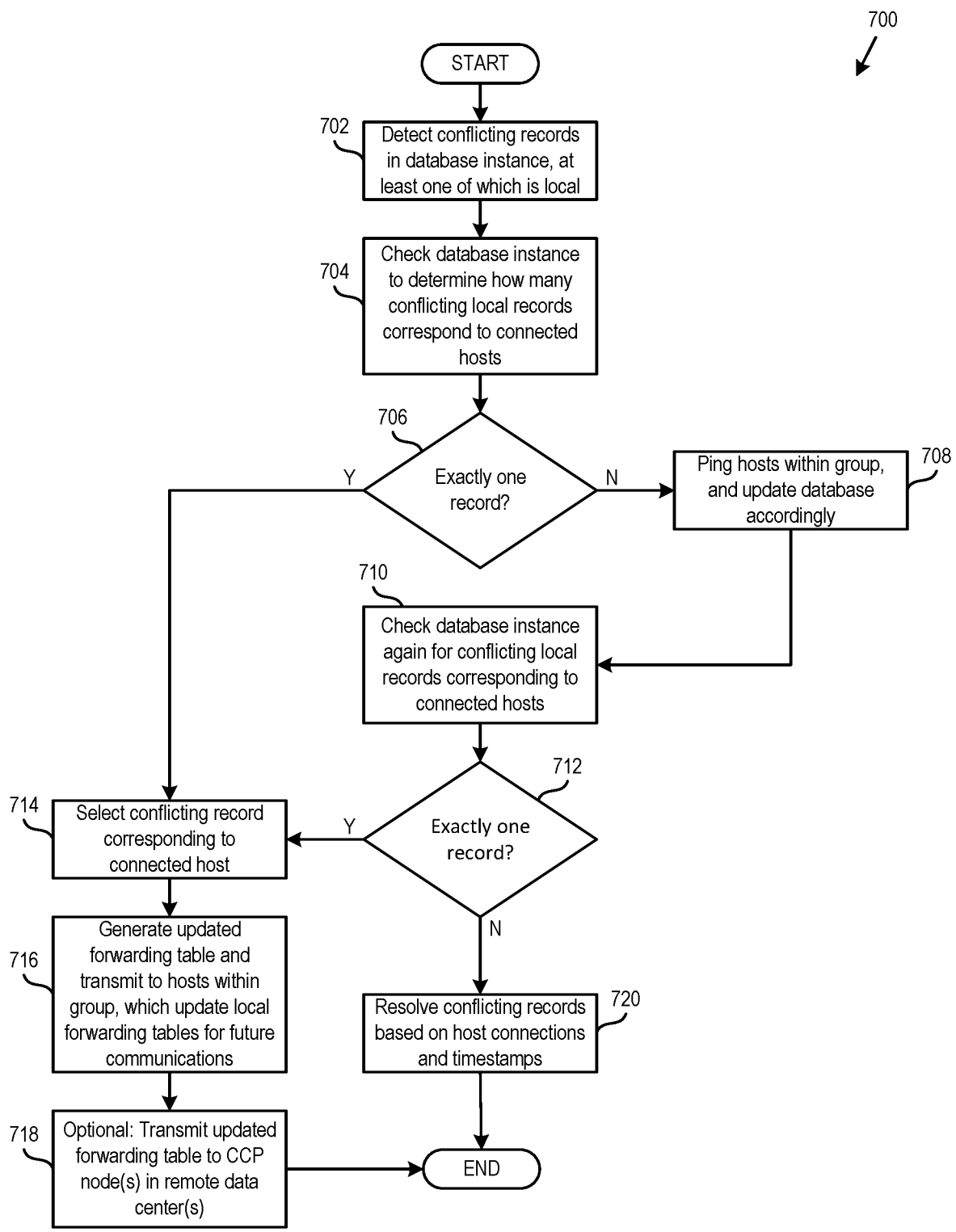
FIG. 7 is a flow diagram of steps carried out by a central control plane node to carry out a method of resolving a conflict between records by using connection statuses, according to embodiments.

FIG. 7 is a flow diagram of steps carried out by a CCP node 140 to carry out a method 700 of resolving a conflict between records by using connection statuses, according to embodiments. At step 702, CCP node 140 detects conflicting records in database 140, e.g., comprising conflicting ARP, VTEP, or MAC mappings. Such conflicting mappings may be detected as mappings in which a first portion of each mapping is the same, but in which the first portions are mapped to different addresses or ports. Furthermore, in multiple data center embodiments, the conflicting records include at least one local record. When conflicting records are all remote, the conflict must be resolved based on timestamps, as discussed below in conjunction with FIG. 8.

At step 704, CCP node 140 checks database instance 170 to determine how many of the conflicting local record(s) correspond to a host that is connected to the control plane, i.e., that has a connection status that is up. At step 706, if exactly one record corresponds to a connected host, method 700 moves to step 714. If there are either no such records or a plurality of such records, method 700 moves to step 708.

At step 708, CCP node 140 pings any hosts 110 within its group that correspond to the conflicting records. CCP node 140 further updates database instance 170 accordingly, setting the connection status for any host that responds to "1" and setting the connection status for any host that does not respond to "0." Any other CCP nodes, which also detect the conflicting records, perform the same step of pinging respective hosts and updating respective database instances. The pinging of step 708 may enable CCP nodes to discover changes in connectivity statuses more quickly than passively detecting such changes.

At step 710, CCP node 140 checks database instance 170 again to determine if the number of conflicting local records corresponding to connected hosts has changed. At step 712, if there is now exactly one such record, method 700 moves to step 714, and CCP node 140 selects the record as the correct record. At step 716, CCP node 140 generates an updated forwarding table including the mapping from the selected record and transmits a forwarding table message including the updated forwarding table to each host 110 within its group. At step 718, which applies to multiple data center embodiments with a stretched logical switch, CCP node 140 transmits the forwarding table message to a CCP node(s) in a remote data center(s). After step 718, method 700 ends.

Referring back to step 712, if there are still either no records corresponding to connected hosts or a plurality of such records, method 700 moves to step 720. At step 720, CCP node 140 resolves the conflicting records based on timestamps. Such resolution is discussed below in conjunction with FIG. 8. After step 720, method 700 ends.

Figure 8:
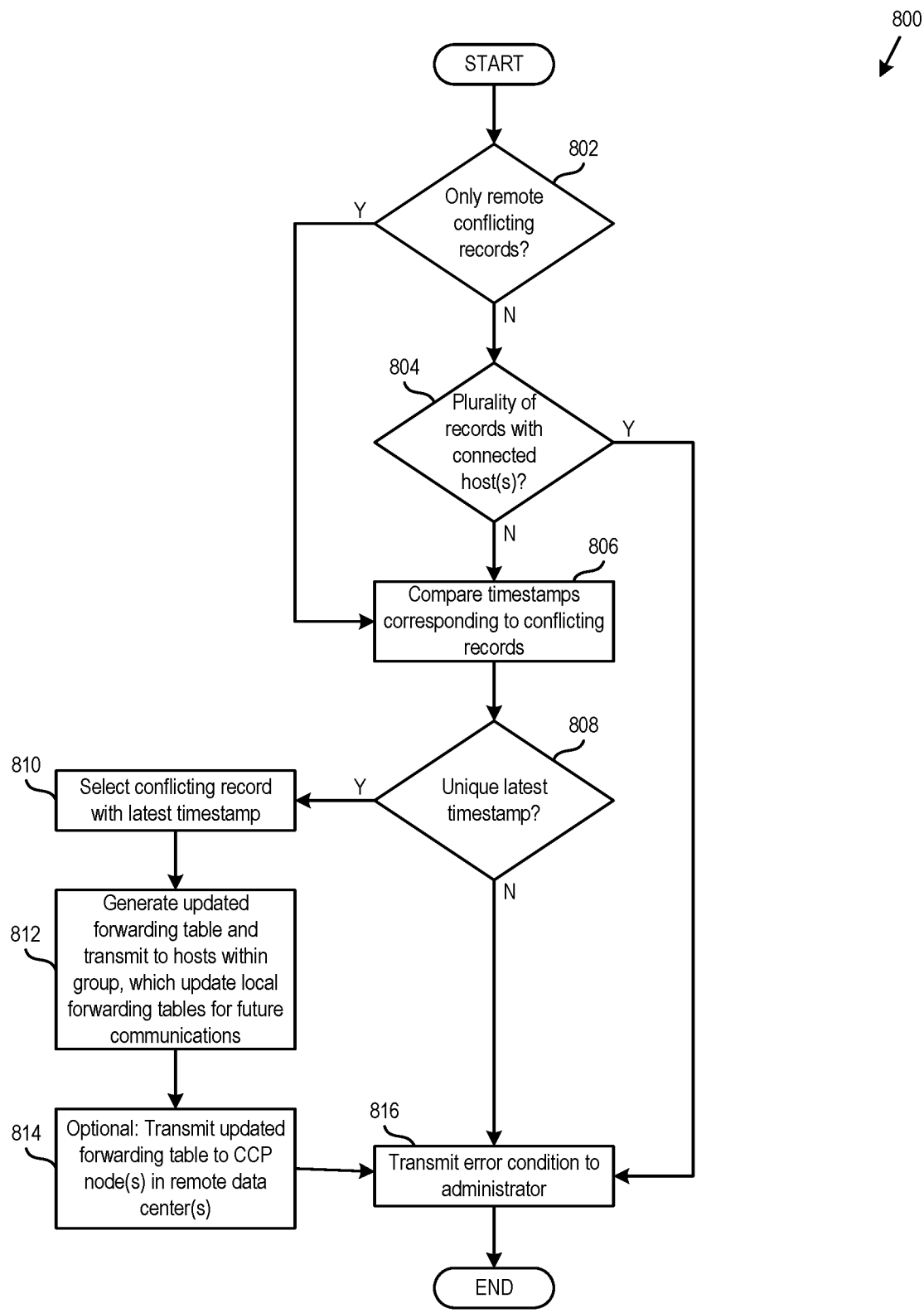
FIG. 8 is a flow diagram of steps carried out by a central control plane node to carry out a method of resolving a conflict between records by using timestamps, according to embodiments.

FIG. 8 is a flow diagram of steps carried out by CCP node 140 to carry out a method 800 of resolving a conflict between records by using timestamps, according to embodiments. Method 800 is triggered by the determination that among conflicting records, (1) all the conflicting records are remote (in a multiple data center embodiment), or (2) either none of the records or multiple of the records correspond to a host(s) whose connection statuses are up.

At step 802, if there are only remote conflicting records, method 800 moves to step 806. Otherwise, if there is at least one local conflicting record, method 800 moves to step 804. At step 804, CCP node 140 checks if there is a plurality of conflicting records corresponding to a host(s) with an "up" connection status(es). If there is not a plurality of such records, i.e., no such records, method 800 moves to step 806. At step 806, the conflict could be due to an error by an administrator such as spinning up two VMs with the same IP address and different MAC addresses. However, the conflict may also be due to an issue that was not caused by the administrator such as multiple hosts losing power. CCP node 140 resolves the conflict by comparing the timestamps corresponding to the conflicting records.

At step 808, if CCP node 140 determines a latest timestamp that is unique, method 800 moves to step 810, and CCP node 140 selects the record with the latest timestamp. At step 812, CCP node 140 generates an updated forwarding table including the mapping from the selected record and transmits a forwarding table message including the updated forwarding table to each host 110 within its group. The latest record is likely correct and is thus a logical choice. At step 814, which applies to multiple data center embodiments with a stretched logical switch, CCP node 140 transmits the forwarding table message to a CCP node(s) in a remote data center(s).

Returning to step 808, if CCP node 140 does not determine such a unique timestamp, method 800 moves directly to step 816 without CCP node 140 selecting a conflicting record. For example, there may be multiple timestamps that are equal to each other if they each correspond to mappings that were detected at the control plane at the same time. In such a case, the order in which the mappings were detected cannot be determined from the timestamps. Returning to step 804, if a plurality of conflicting records correspond to hosts whose connection statuses are up, method 800 moves directly to step 816 without CCP node 140 selecting a conflicting record. Multiple records corresponding to connected hosts indicates that conflicting mappings are actively being used, which indicates an error by the administrator.

At step 816, CCP node 140 transmits an error condition to the administrator indicating the conflicting records. In response, if there was an error made by the administrator, the administrator may update IP or MAC addresses to eliminate the conflict. CCP node 140 also informs the administrator of which, if any, record was selected at step 810. After step 816, method 800 ends.

The embodiments described herein may employ various computer-implemented operations involving data stored in computer systems. For example, these operations may require physical manipulation of physical quantities. Usually, though not necessarily, these quantities are electrical or magnetic signals that can be stored, transferred, combined, compared, or otherwise manipulated. Such manipulations are often referred to in terms such as producing, identifying, determining, or comparing. Any operations described herein that form part of one or more embodiments may be useful machine operations.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations. The embodiments described herein may also be practiced with computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data that can thereafter be input into a computer system. Computer readable media may be based on any existing or subsequently developed technology that embodies computer programs in a manner that enables a computer to read the programs. Examples of computer readable media are HDDs, SSDs, network-attached storage (NAS) systems, read-only memory (ROM), RAM, compact disks (CDs), digital versatile disks (DVDs), magnetic tapes, and other optical and non-optical data storage devices. A computer readable medium can also be distributed over a network-coupled computer system so that computer-readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and steps do not imply any particular order of operation unless explicitly stated in the claims.

Virtualized systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data. Many variations, additions, and improvements are possible, regardless of the degree of virtualization. The virtualization software can therefore include components of a host, console, or guest operating system (OS) that perform virtualization functions.

Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined component. Similarly, structures and functionalities presented as a single component may be implemented as separate components. These and other variations, additions, and improvements may fall within the scope of the appended claims.

What is claimed is:

1. A method of resolving conflicts between layer-2 (L2) mappings created for workloads executing on a plurality of hosts, wherein the L2 mappings are recorded in a first database managed by a network management server, said method comprising:
    upon receipt of a first mapping reported by a first host, determining that the first mapping is not recorded in the first database;
    in response to the determining that the received first mapping is not recorded in the first database, generating a first timestamp and persisting a first record in the first database, wherein the first record includes the first mapping and the first timestamp;
    detecting a second record in the first database, wherein the second record includes a second mapping that was reported by a second host, a first portion of the first mapping is identical to a first portion of the second mapping, and a second portion of the first mapping is different from a second portion of the second mapping;
    determining that the first mapping is up-to-date; and
    in response to the determining that the first mapping is up-to-date, transmitting a forwarding table message to one or more hosts of the plurality of hosts, wherein the forwarding table message includes the first mapping and does not include the second mapping, and the one or more hosts store the first mapping in one or more forwarding tables used by the one or more hosts to manage traffic to or from a workload executing on the first host.

2. The method of claim 1, wherein the determining that the first mapping is up-to-date comprises:
    determining that a connection status of the first host is up and that a connection status of the second host is down.

3. The method of claim 1, further comprising:
    comparing the first timestamp of the first record to a second timestamp associated with the second mapping, wherein the determining that the first mapping is up-to-date comprises
    determining that the second timestamp is earlier than the first timestamp.

4. The method of claim 3, further comprising:
    transmitting the forwarding table message to another network management server, wherein said another network management server stores the first mapping in a second database that is managed by said another network management server.

5. The method of claim 4, wherein the second host reported the second mapping to said another network management server, the second mapping was received from said another network management server for persisting in the first database, and the second timestamp was generated upon receipt of the second mapping from said another network management server.

6. The method of claim 1, wherein the first timestamp is a logical timestamp that indicates an order in which the first timestamp was created relative to other logical timestamps.

7. The method of claim 1, wherein generating the first timestamp comprises:
    synchronizing a clock with a network time protocol (NTP) server; and
    after synchronizing the clock, and in response to receiving the first mapping from the first host, reading the time of the clock and creating the first timestamp based on the read time of the clock.

8. The method of claim 1, wherein the first and second mappings satisfy one of the following:
    (1) the first portions of the first and second mappings are identical internet protocol (IP) addresses assigned to different workloads, and the second portions of the first and second mappings are different media access control (MAC) addresses assigned to the different workloads,
    (2) the first portions of the first and second mappings are identical IP addresses assigned to different virtual tunnel endpoints (VTEPs), and the second portions of the first and second mappings are different MAC addresses assigned to the different VTEPs, and
    (3) the first portions of the first and second mappings are identical MAC addresses assigned to the different workloads, and the second portions of the first and second mappings are different ports assigned to the different VTEPs.

9. The method of claim 1, wherein the workloads are virtual machines.

10. A non-transitory computer readable medium comprising instructions that are executable in a computer system, wherein the instructions when executed cause the computer system to carry out a method of resolving conflicts between layer-2 (L2) mappings created for workloads executing on a plurality of hosts, wherein the L2 mappings are recorded in a first database managed by a network management server, said method comprising:
    upon receipt of a first mapping reported by a first host, determining that the first mapping is not recorded in the first database;
    in response to the determining that the received first mapping is not recorded in the first database, generating a first timestamp and persisting a first record in the first database, wherein the first record includes the first mapping and the first timestamp;

detecting a second record in the first database, wherein the second record includes a second mapping that was reported by a second host, a first portion of the first mapping is identical to a first portion of the second mapping, and a second portion of the first mapping is different from a second portion of the second mapping;

determining that the first mapping is up-to-date; and in response to the determining that the first mapping is up-to-date, transmitting a forwarding table message to one or more hosts of the plurality of hosts, wherein the forwarding table message includes the first mapping and does not include the second mapping, and the one or more hosts store the first mapping in one or more forwarding tables used by the one or more hosts to manage traffic to or from a workload executing on the first host.

11. The non-transitory computer readable medium of claim 10, wherein the determining that the first mapping is up-to-date comprises determining that a connection status of the first host is up and that a connection status of the second host is down.

12. The non-transitory computer readable medium of claim 10, said method further comprising:

comparing the first timestamp of the first record to a second timestamp associated with the second mapping, wherein the determining that the first mapping is up-to-date comprises determining that the second timestamp is earlier than the first timestamp.

13. The non-transitory computer readable medium of claim 12, said method further comprising:

transmitting the forwarding table message to another network management server, wherein said another network management server stores the first mapping in a second database that is managed by said another network management server.

14. The non-transitory computer readable medium of claim 13, wherein the second host reported the second mapping to said another network management server, the second mapping was received from said another network management server for persisting in the first database, and the second timestamp was generated upon receipt of the second mapping from said another network management server.

15. The non-transitory computer readable medium of claim 10, wherein the first timestamp is a logical timestamp that indicates an order in which the first timestamp was created relative to other logical timestamps.

16. The non-transitory computer readable medium of claim 10, wherein generating the first timestamp comprises:

synchronizing a clock with a network time protocol (NTP) server; and after synchronizing the clock, and in response to receiving the first mapping from the first host, reading the time of the clock and creating the first timestamp based on the read time of the clock.

17. The non-transitory computer readable medium of claim 10, wherein the first and second mappings satisfy one of the following:

(1) the first portions of the first and second mappings are identical internet protocol (IP) addresses assigned to different workloads, and the second portions of the first and second mappings are different media access control (MAC) addresses assigned to the different workloads, (2) the first portions of the first and second mappings are identical IP addresses assigned to different virtual tunnel endpoints (VTEPs), and the second portions of the first and second mappings are different MAC addresses assigned to the different VTEPs, and (3) the first portions of the first and second mappings are identical MAC addresses assigned to the different workloads, and the second portions of the first and second mappings are different ports assigned to the different VTEPs.

18. The non-transitory computer readable medium of claim 10, wherein the workloads are virtual machines.

19. A computer system comprising:

a first plurality of hosts, each of which employs forwarding tables stored therein to manage traffic to or from workloads executing thereon; and a first network management server communicating with the first plurality of hosts to resolve conflicts between layer-2 (L2) mappings recorded in a first database, wherein the first network management server is programmed to:

upon receipt of a first mapping reported by a first host, determine that the first mapping is not recorded in the first database, in response to the determining that the received first mapping is not recorded in the first database, generate a first timestamp and persist a first record in the first database, wherein the first record includes the first mapping and the first timestamp, detect a second record in the first database, wherein the second record includes a second mapping that was reported by a second host, a first portion of the first mapping is identical to a first portion of the second mapping, and a second portion of the first mapping is different from a second portion of the second mapping, determine that the first mapping is up-to-date, and in response to the determining that the first mapping is up-to-date, transmit a forwarding table message to one or more hosts of the first plurality of hosts, wherein the forwarding table message includes the first mapping and does not include the second mapping, and the one or more hosts store the first mapping in one or more forwarding tables used by the one or more hosts to manage traffic to or from a workload executing on the first host.

20. The computer system of claim 19, wherein the determining that the first mapping is up-to-date comprises determining that a connection status of the first host is up and that a connection status of the second host is down.

21. The computer system of claim 19, wherein the first network management server is further programmed to:

compare the first timestamp of the first record to a second timestamp associated with the second mapping, wherein the determining that the first mapping is up-to-date comprises determining that the second timestamp is earlier than the first timestamp.

22. The computer system of claim 21, further comprising:

a second plurality of hosts, each of which employs forwarding tables stored therein to manage traffic to or from workloads executing thereon; and a second network management server communicating with the second plurality of hosts to resolve conflicts between L2 mappings recorded in a second database, wherein the first network management server is further programmed to:

transmit the forwarding table message to the second network management server, wherein the second network management server stores the first mapping in the second database.

23. The computer system of claim 22, wherein the first host is one of the first plurality of hosts, the second host is one of the second plurality of hosts, the second mapping is transmitted by the second network management server to the first network management server for persisting in the first database, and the first network management server generated the second timestamp upon receipt of the second mapping from the second network management server.

24. The computer system of claim 19, wherein the first timestamp is a logical timestamp that indicates an order in which the first timestamp was created relative to other logical timestamps.

25. The computer system of claim 19, wherein generating the first timestamp comprises:

synchronizing a clock of the first network management server with a network time protocol (NTP) server, and after synchronizing the clock, and in response to receiving the first mapping from the first host, reading the time of the clock and creating the first timestamp based on the read time of the clock.

26. The computer system of claim 19, wherein the first and second mappings satisfy one of the following:
  (1) the first portions of the first and second mappings are identical internet protocol (IP) addresses assigned to different workloads, and the second portions of the first and second mappings are different media access control (MAC) addresses assigned to the different workloads,
  (2) the first portions of the first and second mappings are identical IP addresses assigned to different virtual tunnel endpoints (VTEPs), and the second portions of the first and second mappings are different MAC addresses assigned to the different VTEPs, and
  (3) the first portions of the first and second mappings are identical MAC addresses assigned to the different workloads, and the second portions of the first and second mappings are different ports assigned to the different VTEPs.

27. The computer system of claim 19, wherein the workloads are virtual machines.

* * * * *